L. T. JONES.
Bearing for Shafts.

No. 196,907. Patented Nov. 6, 1877.

WITNESSES
Mary P. Utley.
F. J. Masi

INVENTOR
Levin T. Jones,
by E. W. Anderson,
ATTORNEY

UNITED STATES PATENT OFFICE.

LEVIN T. JONES, OF BALTIMORE, MARYLAND.

IMPROVEMENT IN BEARINGS FOR SHAFTS.

Specification forming part of Letters Patent No. 196,907, dated November 6, 1877; application filed October 6, 1877.

*To all whom it may concern:*

Be it known that I, LEVIN T. JONES, of Baltimore, in the county of Baltimore and State of Maryland, have invented a new and valuable Improvement in Bearings to Prevent the End Motion of Shafting; and I do hereby declare that the following is a full, clear, and exact description of the construction and operation of the same, reference being had to the annexed drawings, making a part of this specification, and to the letters and figures of reference marked thereon.

Figure 1:
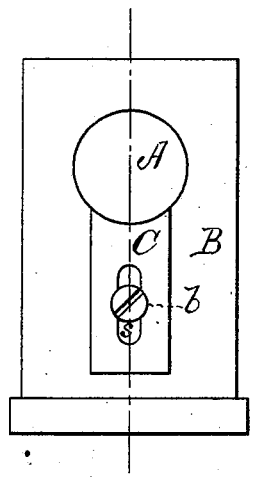
Figure 2:
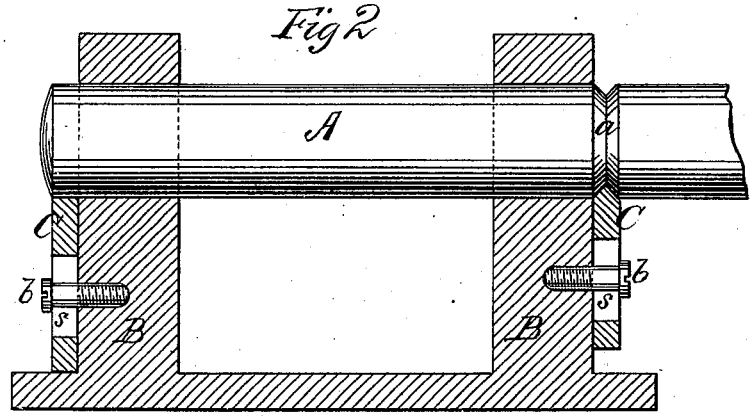
Figure 3:
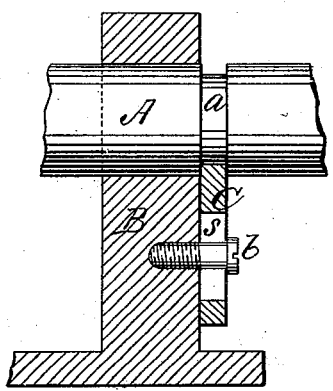

Figure 1 of the drawings is a representation of an end view of my invention. Fig. 2 is a longitudinal central section of the same. Fig. 3 is a modification thereof in section.

This invention has relation to improvements in bearings for shafts in mechanical devices.

The object of the invention is to devise simple and reliable means for preventing endwise motion in shafts without employing collars or other like devices, and at the same time to take up lost motion.

The nature of the invention consists in a plain shaft mounted in suitable bearings, and having an annular groove formed therein, at right angles to the axis of revolution of the said shaft, into which the concave upper end of an adjustable plate upon the pillow-block is adapted to be received, thereby effectually correcting any tendency to endwise motion in the said shaft, and providing means for taking up any lost motion, as will be hereinafter more fully set forth.

In the annexed drawings, the letter A indicates a cylindrical shaft, of any suitable material, mounted, in the customary manner, in the pillow-blocks B. These latter may be provided with the usual brasses, of Babbitt metal or other suitable material, upon which the said shaft will rest. This shaft is plain from end to end, and is provided, outside of its bearings in the blocks B, with a sufficiently-deep annular groove, $a$, in a plane at right angles to the longitudinal axis of the said shaft. This groove may be angular in form or rectangular, and is designed to receive the concave upper end of a strong metallic guide-plate, C, rigidly, but adjustably, secured to the pillow-block. This plate is provided with a longitudinal slot, $s$, through which a set screw, or screws, $b$, is passed, and screwed into the pillow-block, thereby clamping the said plate firmly in position against the said block. This plate being immovable relative to the pillow-block, and its upper end being engaged in the groove $a$, all tendency to endwise movement of the shaft is absolutely corrected. One of these plates may be applied, at each end of the shaft, to each of the blocks, though only one of them will be seated in a groove under ordinary circumstances.

Should there be any lost motion it may be taken up by loosening the clamp-screws $b$, raising plate C, and then reapplying the said screws, so as to hold the said plates to their new adjustment.

By this means the shaft is not only prevented from having the least endwise play, but any lost motion may be rapidly and easily taken up, both results being attained by one and the same device.

What I claim as new, and desire to secure by Letters Patent, is—

1. The journal-bearing having an adjustable plate or plates, adapted to support and prevent endwise play of a journal grooved to receive said plate on its extremity or extremities, substantially as specified.

2. The combination, with the pillow-blocks B and the vertically-adjustable guide-plate C, of the shaft A, having annular groove $a$, adapted to receive the upper end of said plate, substantially as specified.

In testimony that I claim the above I have hereunto subscribed my name in the presence of two witnesses.

LEVIN T. JONES.

Witnesses:
W. S. WILKINSON,
JAMES C. G. UNDUCT.